United States Patent [19]

Spiess et al.

[11] Patent Number: 5,160,213

[45] Date of Patent: * Nov. 3, 1992

[54] COVERING FOR A GROUND OPENING

[75] Inventors: Hansruedi Spiess, Delemont; Francois Galvanetto, Alle, both of Switzerland

[73] Assignee: Von Roll AG, Gerlafingen, Switzerland

[*] Notice: The portion of the term of this patent subsequent to May 21, 2008 has been disclaimed.

[21] Appl. No.: 659,194

[22] Filed: Feb. 21, 1990

Related U.S. Application Data

[63] Continuation of Ser. No. 375,774, Jul. 5, 1989.

[30] Foreign Application Priority Data

Jul. 5, 1988 [CH] Switzerland ............... 2546/88

[51] Int. Cl.⁵ .................................. E02D 29/14
[52] U.S. Cl. ............................ 404/25; 52/19
[58] Field of Search ............ 404/25, 26; 52/19, 20, 52/21; 49/463, 397, 465; 16/254, 260, 262, 267, 268, 355, 386; 137/364, 371

[56] References Cited

U.S. PATENT DOCUMENTS

| | | | |
|---|---|---|---|
| 3,501,874 | 3/1970 | Hahne | 404/25 |
| 3,663,990 | 5/1972 | Shane | 16/355 |
| 3,977,124 | 8/1976 | Oger | 49/463 |
| 4,015,373 | 4/1977 | Boissier | 52/20 |
| 4,456,397 | 6/1984 | Freis et al. | 404/25 |
| 4,499,695 | 2/1985 | Oger et al. | 52/19 |
| 4,508,469 | 4/1985 | Dumortier | 404/25 |
| 4,756,055 | 6/1988 | Welsh et al. | 16/260 |
| 4,840,514 | 6/1989 | DeFrance et al. | 404/25 |

FOREIGN PATENT DOCUMENTS 2120303 11/1983 United Kingdom ............... 52/20

*Primary Examiner*—William P. Neuder
*Attorney, Agent, or Firm*—EGLI International

[57] ABSTRACT

A covering for a ground opening includes a frame in which a cover can be inserted. The frame has a recess for receiving a retaining web shaped onto the edge of the cover. A niche with a sloping bearing surface is formed in the frame at a distance from the recess. The cover has a cam. When the cover is in the closed position, a supporting wall provided on the cam formed on the cover edge rests on a bearing surface of the frame, so that, on closing the cover, the later is moved in the direction of the recess and assumes a locked position. Thus, the cover is held in a clearance-free manner in the frame.

7 Claims, 3 Drawing Sheets

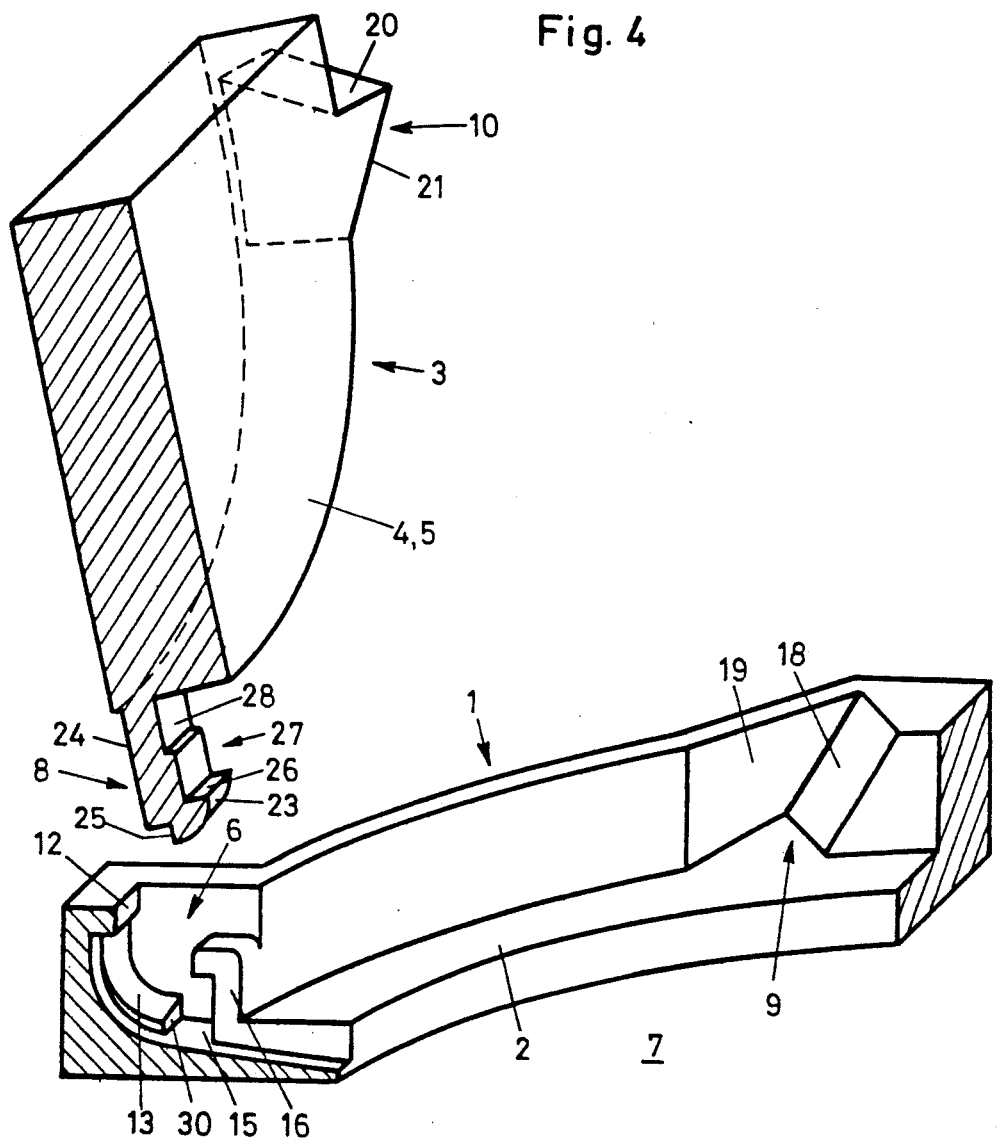

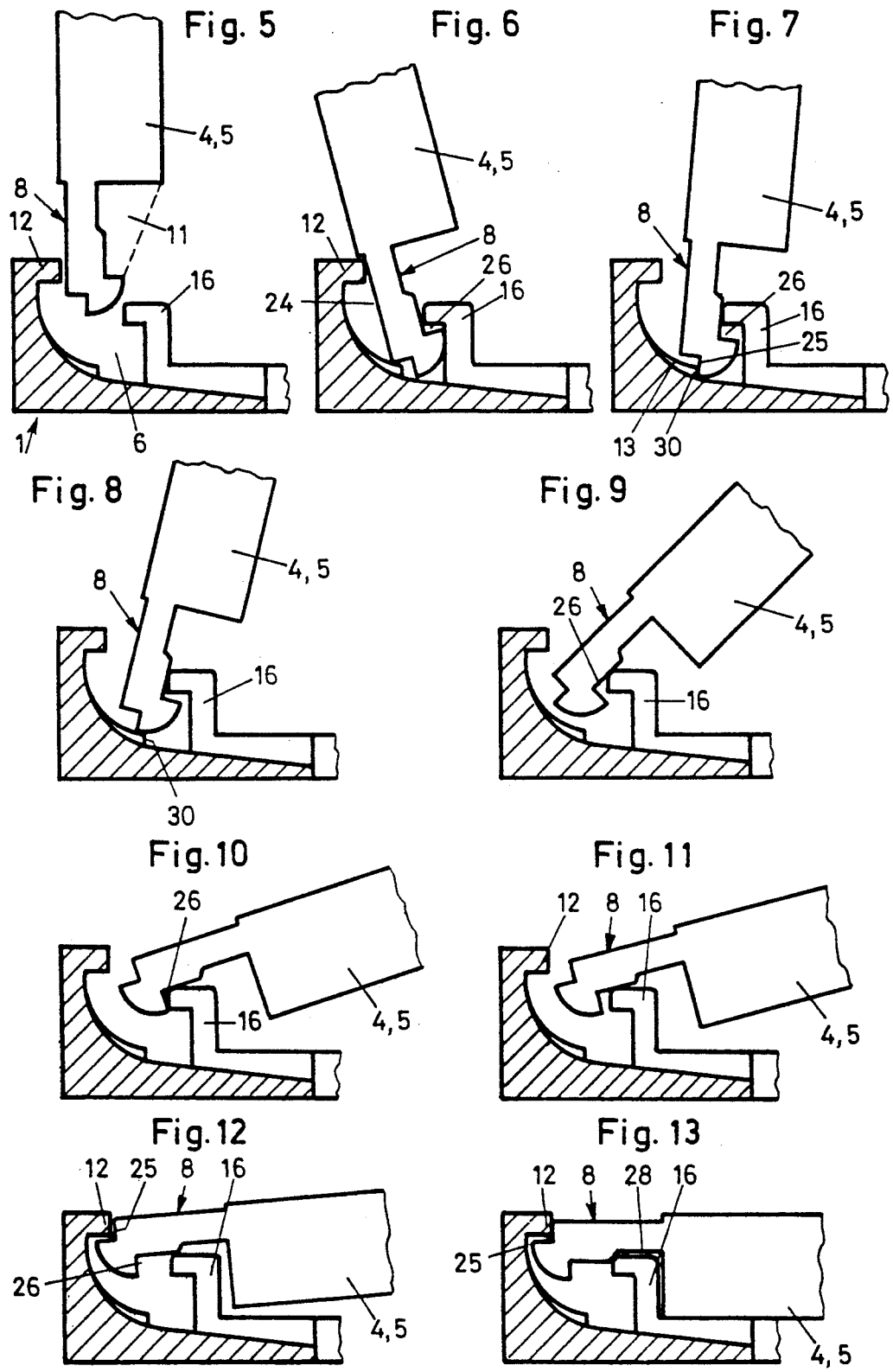

COVERING FOR A GROUND OPENING

This is a continuation of Ser. No. 07/375,774, filed on Jul. 5, 1989.

BACKGROUND OF THE INVENTION

The present invention relates to a covering for an opening provided in the ground and which can be covered by a removable cover or grating to give access to the opening and for which a bearing part is provided on the inside of a frame positioned in the ground. A retaining web is shaped on the cover or grating and is insertable into a recess having a hinge located on the inside of the frame.

Numerous different constructions for ground and floor opening coverings are known. Apart from the known constructions, in which the cover or grating is insertable in a bearing surface provided on the inside of the frame, constructions are also known in which the cover or grating is connected to the frame by a hinge means. Thus, the cover or grating is pivotable about an axis located in the frame, so that the cover or grating can more easily be brought into its opening position.

In a known construction (FR-A-2 548 254), an insert is inserted in a recess closed at three sides. Two curved guide slots are formed in the insert. The retaining web shaped onto the cover can be introduced into the slots. To achieve this, two circular pins are shaped onto the free end of the retaining web so as to form the axis of rotation of the cover, which project into the guide slots. In order that the insert cannot slip out of the recess on the opening of the cover, retaining lugs are provided on the insert, which engage in a depression provided in the recess, accompanied by elastic deformation of the insert. However, in order that a reliable holding and retaining action is achieved, a relatively high precision of dimensions of the insert and retaining lug, as well as the depressions in the frame recess are required, and this is not achievable without additional expenditure in the conventional production of the coverings by casting. In another known construction (US-A-3 130 651), a rectangular cover is inserted in a rectangular frame. A retaining web is shaped onto the edge or rim of the cover. The web is provided on either side with a circular pivot pin. The pivot pins are inserted in guide grooves formed on the sides of a recess in the covering frame. Within the guide grooves, the pivot pins form a pivot axis about which the cover can be pivoted. However, the pivot pins can easily slip out of the guide grooves, if the cover is elastically deformed by the traffic travelling over it. The same applies in the case of a third known construction (GB-A-474250). In this construction the cover is triangular and the guide pins are located on the ends of one side of a triangle. Correspondingly, there are two recesses in the frame, in which in each case is formed a guide groove for receiving a pivot pin.

All known coverings with hinge-like means for pivoting the cover or grating make use of pivot pins, which are usually shaped onto the retaining web of the cover or grating, or in the recess. These pins can be relatively easily damaged. However, if they are kept small, they constitute parts which, on opening the cover and due to handling by the operator, can be highly stressed or strained.

SUMMARY OF THE INVENTION

It is an object of the present invention to provide an improved covering with a pivot axis in the frame and in which hinge-like means for pivoting the cover or grating can be constructed without pivot pins, but still a positive and reliable retaining and holding effect would be ensured in the frame in the closed position.

According to the invention this and other objects of the invention are attained by a covering, in which the cover or grating has a cam spaced from the retaining web on its outer circumference and which is provided with a supporting surface inclined towards the plane of the cover or grating, and which in the closed position of the cover or grating engages on a bearing surface located on a niche formed on the inside of the frame for receiving the cam, so that the retaining web is moved into a locking position when the cover or grating is in the closed position. Appropriately, the frame recess is separated from the opening by a hook-like web, on which rests the underside of the retaining web. At the transition of the cover or grating part, on the underside of the frame, there is provided a set-back part, in which a hook-like web engages in the closed position.

The invention is described in greater detail hereinafter relative to an embodiment and the attached drawings.

BRIEF DESCRIPTION OF THE DRAWINGS

FIG. 4 is a partial perspective view of the frame according to FIG. 1 and a cover of the covering; and FIGS. 5 to 13 illustrate various phases of the insertion of the cover in the frame and closing of the covering, in which:

FIG. 5 shows the start of the insertion of the cover;

FIG. 6 shows the engagement of the opened cover on the frame edge;

FIG. 7 illustrates the prevention of the cover closure in the case of undesired tilting thereof;

FIG. 8 depicts the start of the closing process through slightly, raising the cover;

FIGS. 9 to 12 show the closing process until just before the closed position is reached; and FIG. 13 illustrates the cover in the locked position.

DETAILED DESCRIPTION OF THE PREFERRED EMBODIMENT

Figure 1:
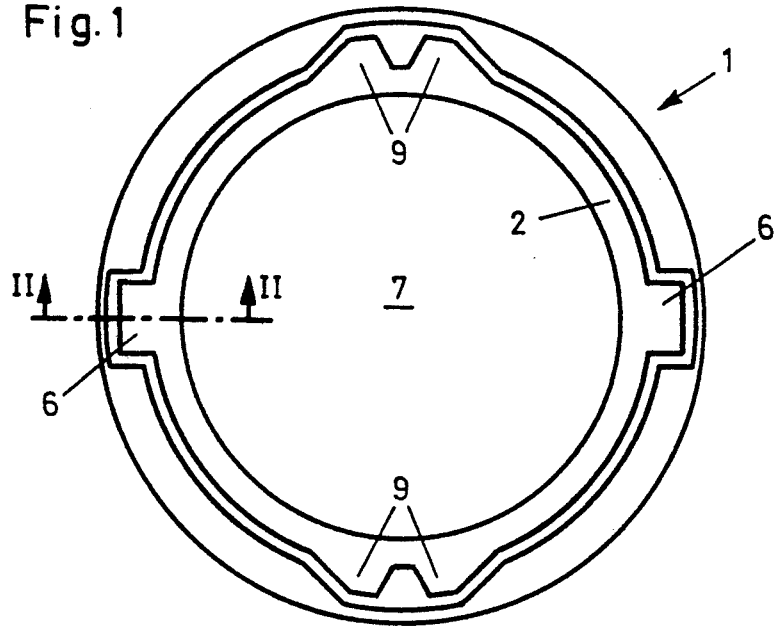
FIG. 1 is a plan view of a substantially circular frame for the insertion of two semicircular covers.

The covering shown in FIG. 1 serves as a closure for a substantially circular opening. The term "opening" is understood to refer to passages of various types, e.g. manhole and shaft openings on roads, squares and in buildings, water drains, passage openings in the floors of buildings, etc. These coverings can be used in different ground surfaces, e.g. asphalt, concrete or soil. In FIG. 1, the covering has a circular frame 1 with an opening 7, on the bearing surface 2 of which, located on the inside, is provided a cover (not shown in FIG. 1 but illustrated in FIG. 4), which comprises two portions or partial covers 4, 5. The frame 1 has two facing recesses 6, into each of which extends a retaining web 8 shaped onto the partial cover edge or rim for forming a hinge means.

Moreover, niches 9 are provided, spaced from the recesses 6 in frame 1, i.e. in each case two niches 9 for a partial cover 4, 5 so that when the cover is in the closed position, cams 10 arranged on the partial cover edge engage therein. The function of the cams will be described in detail hereinafter.

Figure 2:
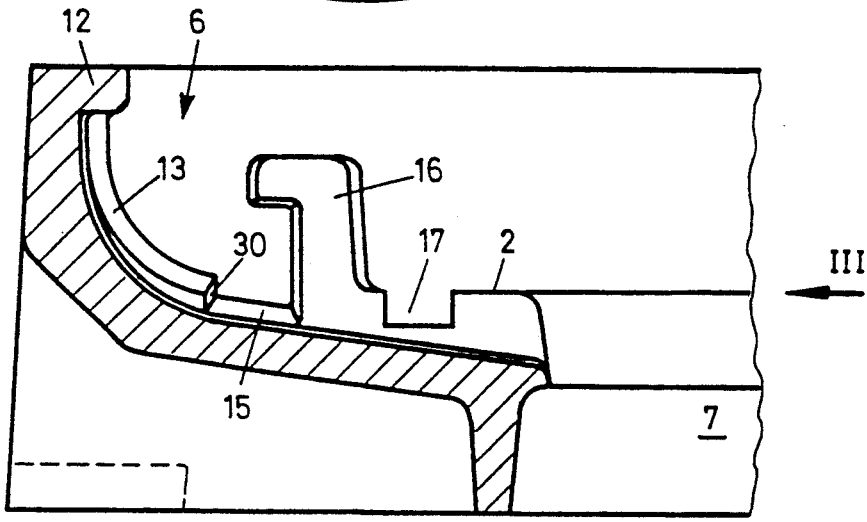
FIG. 2 is a sectional view taken along line II—II of FIG. 1, on a larger scale.

FIG. 2 is a partial sectional view through frame 1 in the vicinity of recess 6. Recess 6 is bounded to the outside by the frame wall with an inwardly protruding hook-shaped edge or end projection 12. On the inside, the frame wall forms a concave portion or projection 13, in the center of which is formed a channel 15, which is inclined towards central opening 7 in frame 1.

Figure 3:
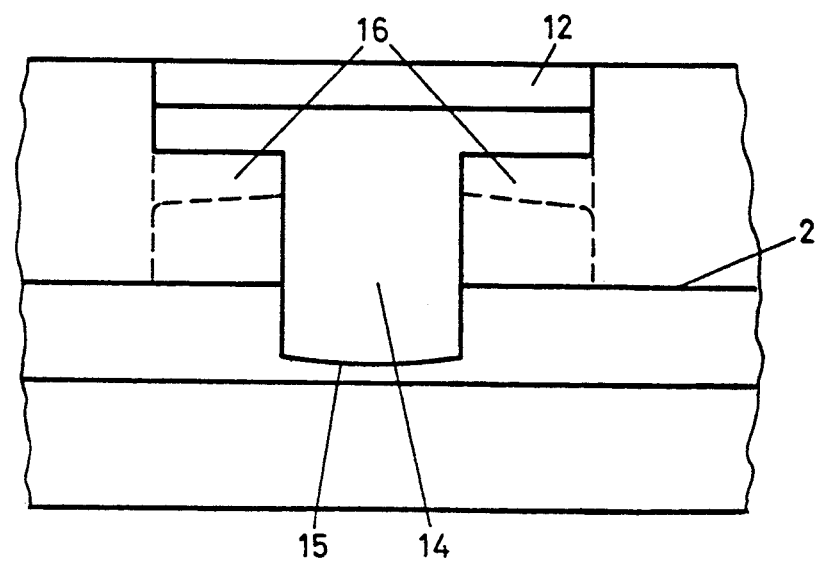
FIG. 3 is a view of the inside of the frame seen from direction III—III in FIG. 2.

Recess 6 in the direction towards opening 7 is bounded by a hook-like web 16, which encloses in the center part thereof channel 15, cf. also FIG. 3. A circular groove 17, in which can be inserted a not shown soft sealing ring, is provided in the bearing surface 2 for the cover. FIG. 3 shows the hook-like web 16, within which passes the channel 15.

FIG. 4 shows a quarter of frame 1 and a half of partial cover 4, 5. It is possible to see in FIG. 4 recess 6 with the edge projection 12, channel 15 and hook-shaped web 16. Groove 17 has been omitted from bearing surface 2 so as to not overburden the representation of frame 1.

Niche 9 spaced from the recess 6 can also be seen on frame 1. Niche 9 has a bearing surface 18 sloping relative to recess 6 and forming one wall of niche 9, whilst the other niche wall 19 is preferably at an acute angle to the bearing surface 18 and only slopes slightly as opposed to bearing surface 18.

The partial cover 4, 5 has two cams 10 (only one being shown) which, when the partial cover 4, 5 is in the closed position, project into the corresponding niches 9. Cam 10 is bounded by a support wall or surface 20 corresponding to bearing surface 18 and which in the closed position engages on bearing surface 18 of niche 9. The other cam wall 21 extends immediately alongside the other niche wall 19.

Partial cover 4, 5 has retaining web 8, which is constructed in a special way. The retaining web 8 is provided at its free end with a convex end portion 23, which is bounded on the web top 24 by a first set-back portion 25, whilst a second set-back portion 26 bounds the convex end portion on the web bottom 27.

At the foot of retaining web 8, at the transition towards the edge of the partial cover, web bottom 27 has a set-back surface 28, which cooperates with the hook-shaped web 16, as will be explained in detail hereinafter.

The hinge function of retaining web 8 and recess 6 will be explained in connection to FIGS. 5 to 13.

In FIG. 5, retaining web 8 is inserted into recess between the end or edge projection 12 and the hook-shaped web 16. For this purpose the partial cover 4, 5 can be kept in a substantially vertical position. Web 8 has a rib 11 positioned at its bottom and in the center of the Web. The rib 11 is utilized to reinforce the web 8.

FIG. 6 shows the partial cover 4, 5 in its open position. At this stage, the top 24 of retaining web 8 rests on the terminating or edge projection 12 while the main part of the partial cover 4, 5 slopes outwards and therefore assumes a stable position. The hook-shaped web 16 prevents the partial cover 4, 5 from tipping out of recess 6.

However, even if the cover 4, 5 is accidentally tilted inwards out of its open position according to FIG. 6, cf. FIG. 7, it is not possible for the partial cover 4, 5 to slam, because a first set-back portion 25 abuts against a shoulder 30, which is formed by the concave portion 13 on the inside edge of the frame. Simultaneously, a second set-back portion 26 strikes against the hook-shaped web 16 and therefore forms a stop, which reliably prevents the slamming of the partial cover 4, 5. If partial cover 4, 5 is now to be brought to its closed position, it must be slightly raised, cf. FIG. 8, so that the first set-back portion 25 is removed from shoulder 30.

On further lowering partial cover 4, 5, cf. FIGS. 9 and 10, the second set-back portion 26 of the retaining web 8 engages on the hook-shaped web 16.

In FIG. 11, partial cover 4, 5 has already been lowered close to its closed position. This is roughly the time at which the support wall or surface 20 of cam 10 comes to rest on the bearing surface 18 of niche 9. FIG. 11 shows that the cover part 4, 5 has necessarily been moved against the retaining edge projection 12.

In FIG. 12, the retaining web 8 has already been moved to such an extent against retaining edge projection 12, that the first set-back portion 25 is located below the edge projection 12. The second set-back portion 26 is still supported on the hook-shaped web 16.

FIG. 13 shows the partial cover 4, 5 in the closed position. The first set-back portion 25 of retaining web 8 engages on edge projection 12, whilst the hook-shaped web 16 engages in the set-back surface 28 of retaining web 8. This is made possible due to the fact that the support wall or surface 20 of cam 10 of partial cover 4, 5 is supported on bearing surface 18 of niche 9 of frame 1. The latter is arranged in such a way that the retaining web 8 is advanced to such an extent against the edge projection 12, that the hook-shaped web 16 engages in the set-back surface 28 of retaining web 8. Through the cooperation of bearing surface 18 of frame 1 with the support wall 20 of partial cover 4, 5, a clearance-free mounting of partial cover 4, 5 in frame 1 is obtained.

It can be gathered from FIGS. 2 and 3 that the bottom of channel 15 and the concave portion 13 of recess 6 have a transverse slope, so that dirt which has entered the recess is moved towards channel 15, so that it passes out of the later into opening 7.

The described covering has the advantage of producing a hinge-like means for swinging the cover into its open position, but the hinge movement is ensured without the use of conventional pivot pins. Thus, there is no need for the use of sensitive pivot pins, and also the cover with its retaining web 8 can be more easily inserted in recess 6. As an embodiment, a circular covering was chosen, in which is provided a two-part cover.

It is obviously possible to also have a one-part cover, in which case niche 9 and cam 10 would be located facing the recess. The shape of the frame and the cover can also be chosen in a random way, e.g. be triangle, rectangle, square or polygon. In addition, the frame 1 can have a shape different from that of the cover, i.e. a square frame and a round cover can be chosen.

The sloping bearing wall or surface 18 ensures a substantially clearance-free arrangement of the cover in the closed position, because the supporting wall or surface 20 brings the cover into a locking position in recess 6. This is achieved without any need for a hinge pin.

The description of the embodiment shown in the drawing has been limited to the use of a cover. However, the latter could be replaced by a grating, without this leading to any change with regards to the pivot pin-free locking means.

It is also possible to additionally lock the cover or partial cover, e.g. on the cover edge facing the retaining web, cf. the patent applications of the present applicant (Swiss application 4600/87 of 26.11.87 - BE 21429 and 4777/87 of 7.12.87 - BE 21428).

There has been disclosed heretofore the best embodiment of the invention presently contemplated. However, it is to be understood that various changes and modifications may be made thereto without departing from the spirit of the invention.

What is claimed is:

1. A covering for an opening provided in the ground, comprising a frame placed in the ground and a cover for covering said frame and being removable from said frame to give access to the opening, said frame including a bearing surface provided on the inside thereof for supporting said cover, said cover including at least one retaining web shaped on said cover, said frame having at least one recess on the inside thereof receiving said web and being provided with a hinge means, said cover further including at least one cam on an outer circumference thereof, said cam being spaced from the retaining web and provided with a supporting wall sloping towards a plane of the cover, said frame being formed on the inside thereof with at least one niche for receiving said cam and having a bearing surface, said frame further including means for supporting said retaining web as said cover is moved to a closed position thereof, said supporting wall of said cam in said closed position of the cover engaging on said bearing surface of said niche to cause the retaining web supported by said supporting means to be moved into a clearance-free locked position in said recess when said cover is in the closed position.

2. Covering according to claim 1, wherein said frame has an opening, said supporting means including a hook-shaped web, said recess of said frame being separated from said opening by said hook-shaped web provided on said frame, said retaining web having a bottom resting on said hook-shaped web in the closed position of said cover, and wherein a set-back surface is provided on said bottom at the transition from said retaining web to a major part of said cover, said hook-shaped web engaging on said set-back surface in the closed position of said cover.

3. Covering according to claim 2, wherein said retaining web of the cover is provided at a free end thereof with a convex end portion which forms a sliding surface supported on a respective concave portion provided on said recess.

4. Covering according to claim 3, wherein said convex end portion of said retaining web is bound at both sides by set-back portions of which one set-back portion in cooperation with said hook-shaped web is adapted to prevent an undesired outward tilting of said cover when the cover is fully open.

5. Covering according to claim 2, wherein said retaining web has on a bottom thereof a rib positioned in a center of said retaining web, said recess being formed with a channel which transverses said hook-shaped web.

6. Covering according to claim 4, wherein said retaining web has on a bottom thereof a rib positioned in a center of said retaining web, said recess being formed with a channel which transverses said hook-shaped web.

7. Covering according to claim 3, wherein said convex and portion has a side surface which is inclined in a direction transverse to the movement direction of the cover on its passing from the open position to the closed position.

* * * * *